US012663851B2

(12) United States Patent
Nemani et al.

(10) Patent No.: US 12,663,851 B2
(45) Date of Patent: Jun. 23, 2026

(54) PLATFORM SKIN TEMPERATURE MANAGEMENT IN COMPUTER SYSTEMS

(71) Applicant: QUALCOMM Incorporated, San Diego, CA (US)

(72) Inventors: Mahadevamurty Nemani, San Diego, CA (US); Arun Sukheja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 18/642,458

(22) Filed: Apr. 22, 2024

(65) Prior Publication Data

US 2025/0328185 A1     Oct. 23, 2025

(51) Int. Cl.
    *G06F 1/00*       (2006.01)
    *G06F 1/20*       (2006.01)
    *G06F 1/3296*     (2019.01)
    *G06Q 10/0631*    (2023.01)

(52) U.S. Cl.
    CPC ............ *G06F 1/3296* (2013.01); *G06F 1/206* (2013.01); *G06Q 10/06315* (2013.01)

(58) Field of Classification Search
    CPC .............................. G06F 1/3296; G06F 1/206
    See application file for complete search history.

(56) References Cited

U.S. PATENT DOCUMENTS

| | | | | |
|---|---|---|---|---|
| 8,019,580 | B1 * | 9/2011 | Chandra ................. | G06F 30/33 |
| | | | | 703/13 |
| 10,534,023 | B1 * | 1/2020 | Sizikov ............... | G06F 11/3062 |
| 2009/0024347 | A1 * | 1/2009 | Chandra .............. | G06F 30/367 |
| | | | | 702/130 |
| 2020/0026338 | A1 * | 1/2020 | Maddukuri ............... | G06F 1/28 |
| 2020/0107877 | A1 * | 4/2020 | Koblish ................... | A61B 5/01 |
| 2020/0372719 | A1 * | 11/2020 | Andjelic ............. | G06F 3/04842 |
| 2021/0258804 | A1 * | 8/2021 | Amini ............... | H04W 52/0206 |
| 2021/0325467 | A1 * | 10/2021 | He ........................ | G01R 31/367 |
| 2022/0357720 | A1 * | 11/2022 | Chng ................... | H05K 1/0203 |

* cited by examiner

*Primary Examiner* — Mohammed H Rehman
(74) *Attorney, Agent, or Firm* — Loza & Loza LLP

(57) ABSTRACT

Aspects of the disclosure are directed to a thermal management system for a computer system. In accordance with one aspect, the disclosure includes generating a transfer function representation of a relationship between a plurality of temperature data sequences and a plurality of dc power consumption data sequences; optimizing a dc power assignment to generate an optimized dc power assignment using the transfer function representation with minimization of a cost function; and distributing a plurality of dc power allocations to a plurality of components in a computer platform using the optimized dc power assignment.

20 Claims, 6 Drawing Sheets

100

200

| WLAN<br>211 | | Charger<br>215 |
|---|---|---|

231    232

| MDM<br>212 | | Battery 216 |
|---|---|---|

| NVMe<br>213 | EC<br>214 | PreBuck<br>217 |
|---|---|---|

233

| 219 |
|---|

| Fan<br>218 | ScC<br>221 | Core<br>PMICs<br>222 | dGPU<br>223 |
|---|---|---|---|

610 ingest a plurality of temperature data sequences $T_i(k)$ from a plurality of thermal sensors in a computer platform

620 ingest a plurality of dc power consumption data sequences $P_j(k)$ from a plurality of dc power monitors in the computer platform

630 generate a transfer function representation of a relationship between the plurality of temperature data sequences $T_i(k)$ and the plurality of dc power consumption data sequences $P_j(k)$

640 optimize a dc power assignment using the transfer function representation with minimization of a cost function

650 distribute a plurality of dc power allocations to a plurality of components in the computer platform using the optimized dc power assignment

PLATFORM SKIN TEMPERATURE MANAGEMENT IN COMPUTER SYSTEMS

TECHNICAL FIELD

This disclosure relates generally to the field of system temperature management, and, in particular, to providing a thermal management system for a computer system.

BACKGROUND

An information processing system, for example, a computing platform, strives for fast throughput, large main memory capacity and low energy usage while adhering to a plurality of temperature constraints. Higher throughput results in better performance but increased thermal dissipation. An optimal thermal management system which maximizes dc power distribution for a computer system under temperature constraints is desired.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a thermal management system for a computer system. Accordingly, an apparatus including: a plurality of thermal sensors configured to measure a plurality of temperature data sequences; a plurality of dc power monitors configured to measure a plurality of dc power consumption data sequences; and a system on a chip (SoC) configured to generate a transfer function representation of a relationship between the plurality of temperature data sequences and the plurality of dc power consumption data sequences.

In one example, the system on a chip (SoC) is further configured to optimize a dc power assignment using the transfer function representation. In one example, the system on a chip (SoC) is further configured to optimize with minimization of a cost function.

In one example, the apparatus further includes a computer platform, and wherein the system on a chip (SoC) is further configured to distribute a plurality of dc power allocations to a plurality of components in the computer platform using an optimized dc power assignment. In one example, the system on a chip (SoC) is further configured to ingest the plurality of temperature data sequences from the plurality of thermal sensors. In one example, the system on a chip (SoC) is further configured to ingest the plurality of dc power consumption data sequences from the plurality of dc power monitors.

Another aspect of the disclosure provides an apparatus for implementing dc power assignment optimization, the apparatus including: means for ingesting a plurality of temperature data sequences from a plurality of thermal sensors in a computer platform; means for ingesting a plurality of dc power consumption data sequences from a plurality of dc power monitors in the computer platform; means for generating a transfer function representation of a relationship between the plurality of temperature data sequences and the plurality of dc power consumption data sequences; means for optimizing a dc power assignment using the transfer function representation with minimization of a cost function; and means for distributing a plurality of dc power allocations to a plurality of components in the computer platform using the optimized dc power assignment.

Another aspect of the disclosure provides a method including: generating a transfer function representation of a relationship between a plurality of temperature data sequences and a plurality of dc power consumption data sequences; optimizing a dc power assignment to generate an optimized dc power assignment using the transfer function representation with minimization of a cost function; and distributing a plurality of dc power allocations to a plurality of components in a computer platform using the optimized dc power assignment.

In one example, the method further includes ingesting the plurality of temperature data sequences from a plurality of thermal sensors in the computer platform. In one example, the method further includes ingesting the plurality of dc power consumption data sequences from a plurality of dc power monitors in the computer platform.

In one example, the transfer function representation includes a plurality of model parameters. In one example, the plurality of model parameters includes a pole of the transfer function representation. In one example, the plurality of model parameters includes a gain of the transfer function representation. In one example, the plurality of model parameters includes an ambient temperature.

In one example, the cost function is subject to a plurality of maximum temperature constraints. In one example, the plurality of maximum temperature constraints includes one or more constraint parameters which are functions of the plurality of model parameters. In one example, the cost function is a weighted quadratic error of a dc power consumption relative to a target dc power allocation for the plurality of components using a plurality of optimization weights.

In one example, the method further includes selecting the plurality of optimization weights to bias the optimization selectively among the plurality of components. In one example, the plurality of optimization weights are based on a dynamic workload (WL) of the plurality of components. In one example, the optimized dc power assignment is solved in polynomial time.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 3 illustrates an example system on a chip (SoC).

FIG. 6 illustrates an example flow diagram for computer platform dc power assignment optimization.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
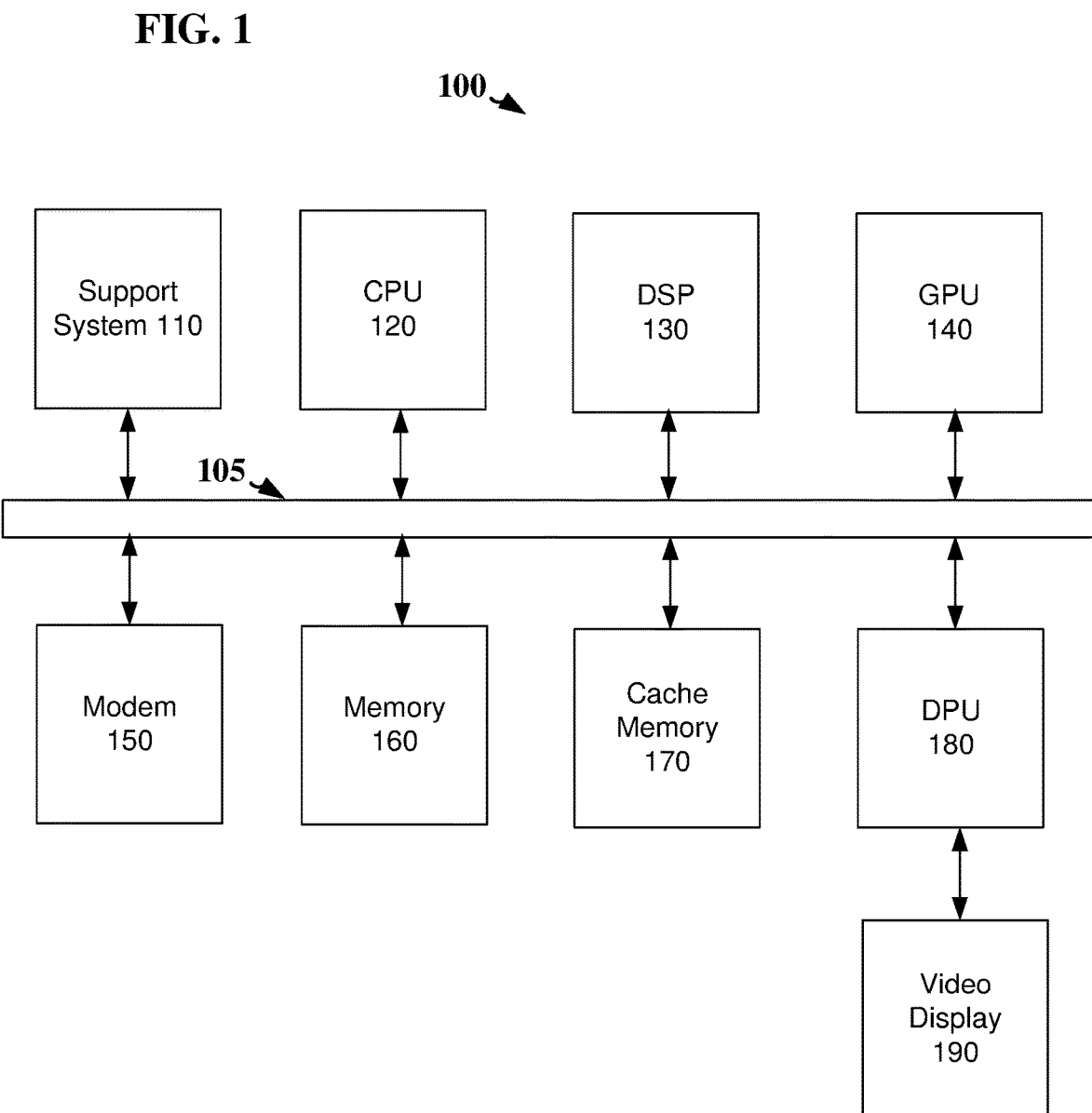
FIG. 1 illustrates an example information processing system.

FIG. 1 illustrates an example information processing system 100. In one example, the information processing system 100 includes a plurality of processing engines, or processor cores, such as a central processing unit (CPU) 120, a digital signal processor (DSP) 130, a graphics processing unit (GPU) 140, a display processing unit (DPU) 180, etc. In one example, various other functions in the information processing system 100 may be included such as a support system 110, a modem 150, a memory 160, a cache memory 170 and a video display 190. For example, the plurality of processing engines and various other functions may be interconnected by an interconnection databus 105 to transport data and control information. For example, the memory 160 and/or the cache memory 170 may be shared among the CPU 120, the GPU 140 and the other processing engines. In one example, the CPU 120 may include a first internal memory which is not shared with the other processing engines. In one example, any processing engine of the plurality of processing engines may have an internal memory (i.e., a dedicated memory) which is not shared with the other processing engines.

Figure 2:
FIG. 2 illustrates an example computer platform.

FIG. 2 illustrates an example computer platform 200. In one example, the computer platform 200 includes a wireless local area network (WLAN) interface 211, a modem 212, a non-volatile memory (NVM) 213, an embedded controller (EC) 214, a charger 215, a battery 216, a voltage regulator (e.g., pre-buck regulator) 217, a fan 218 and a heat pipe 219. In one example, the WLAN interface 211 provides wireless network connectivity using a wireless protocol (e.g., WiFi).

In one example, the modem 212 provides communications signal processing for wireless signals received and transmitted by the WLAN interface 211. In one example, the embedded controller 214 controls various functions in the example computer platform 200 such as controlling fan speed of the fan 218, based on thermal data.

In one example, the computer platform 200 includes a system on a chip (SoC) 221, a plurality of core power management integrated circuits (PMICs) 222 and a dedicated graphical processing unit (dGPU) 223. In one example, the SoC 221 includes a plurality of processing engines and is connected to the EC 214 via an EC-to-SoC interface 224.

In one example, the computer platform includes a plurality of thermal sensors such as a first thermal sensor 231 (e.g., near the modem 212), a second thermal sensor 232 (e.g., near the battery 216), a third thermal sensor 233 (e.g., near the dGPU 223) and a fourth thermal sensor 234 (e.g., near the SoC 221). In one example, the plurality of thermal sensors measures a plurality of temperatures. In one example, the plurality of temperatures is thermal data used by the EC 214 for thermal management.

In one example, the embedded controller (EC) 214 of the computer platform determines dc power consumption of a plurality of components of the computer platform, including the SoC 221 and the dGPU 223. In one example, the SoC 221 and the dGPU 223 dominate the dc power consumption of the plurality of components of the computer platform. In one example, the EC 214 also determines a time window over which a dc power limit needs to be enforced. In one example, the determination of dc power consumption may be updated dynamically (i.e., as a function of time).

In one example, the SoC 221 shown in FIG. 2 may be periodically provided temperature data from a plurality of thermal sensors situated on the computer platform. In one example, the temperature data may be a first discrete sequence $T_i$ and i is a first index. In one example, the temperature data may be updated periodically, for example, every 100 ms or every 1 second. For example, the temperature data may be provided by the EC 214 or by a high-level operating system (HLOS) in another processing engine, or may be directly gathered by the SoC 221 itself. In one example, there may be a quantity of N thermal sensors which provide the temperature data.

In one example, the SoC 221 shown in FIG. 2 may also be periodically provided dc power consumption data from a plurality of dc power monitors situated on the computer platform. For example, the dc power monitors may be dc current monitors (e.g., which may convert dc current measurements to dc power values, given known dc voltage values). In one example, there may be a quantity of M dc power monitors which provide dc power consumption data. For example, the dc power consumption data may be provided through platform telemetry. In one example, the dc power consumption data may be a second discrete sequence $P_j$ and j is a second index.

Figure 3:
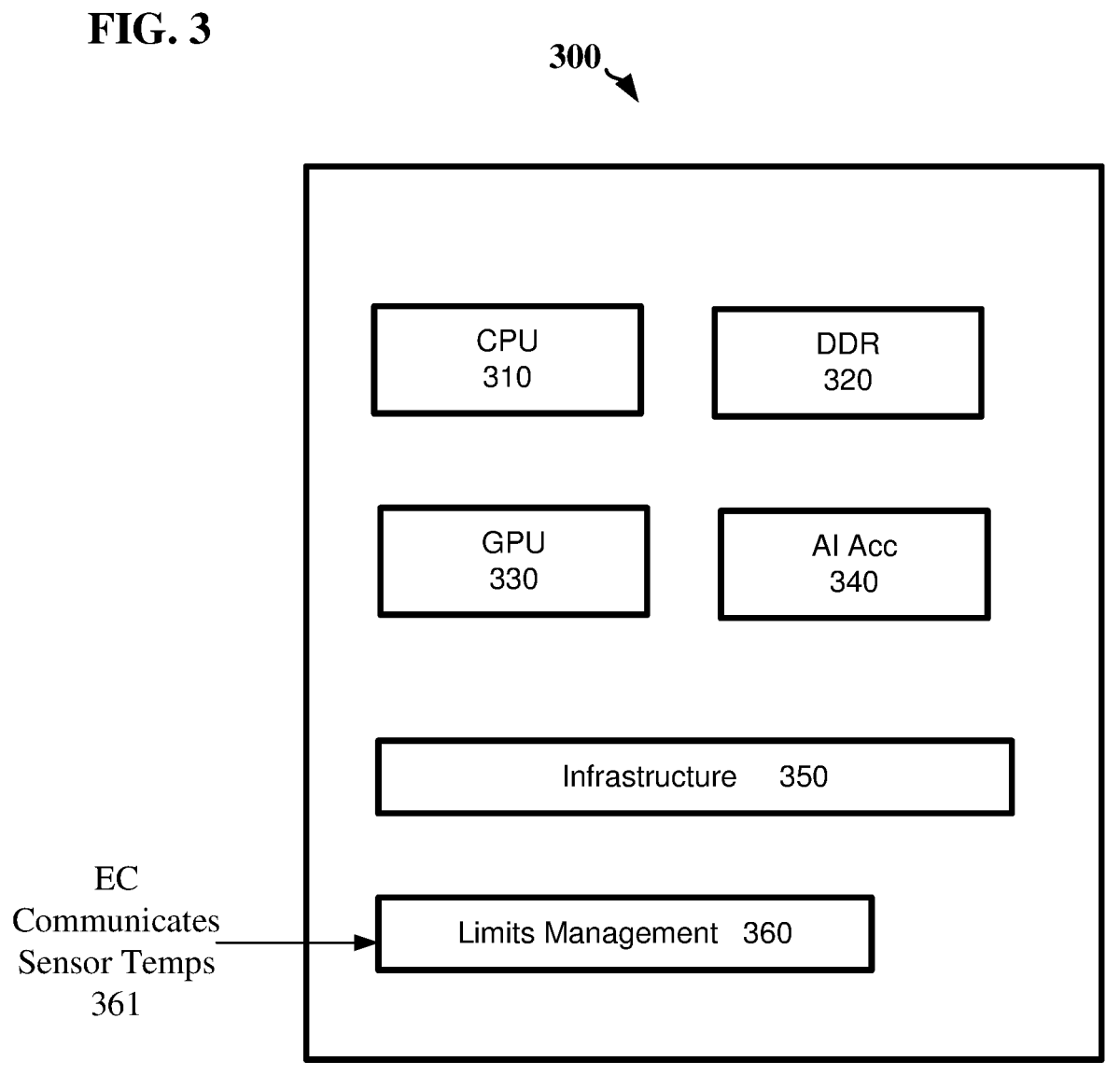

FIG. 3 illustrates an example system on a chip (SoC) 300. In one example, the SoC 300 includes a central processing unit (CPU) 310, a main memory (e.g., DDR memory) 320, a graphical processing unit (GPU) 330, an artificial intelligence accelerator (AI Acc) 340, infrastructure 350 (e.g., signal interconnections, dc power distribution, etc.) and a limits management module 360. In one example, the limits management module 360 receives temperature data 361 from an embedded controller (EC). In one example, the SoC 300 may have its temperature monitored by an external thermal sensor, i.e., a thermal sensor outside, but in proximity, to SoC 300. In one example, the temperature data includes the SoC temperature.

Figure 4:
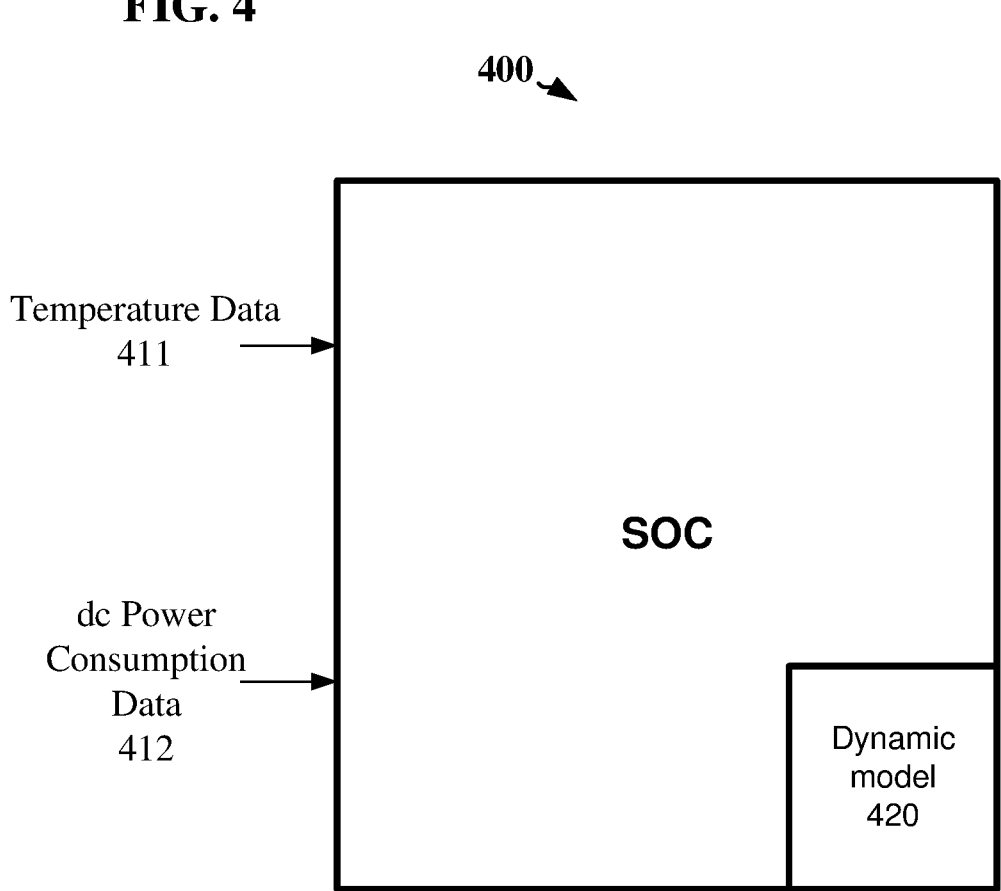
FIG. 4 illustrates an example system on a chip (SoC) functional architecture.

FIG. 4 illustrates an example system on a chip (SoC) functional architecture 400. In one example, the SoC functional architecture 400 includes a SoC 410. In one example, the SoC 410 receives temperature data 411 and dc power consumption data 412 as inputs. In one example, the SoC 410 generates a dynamic model 420 based on the temperature data 411 and the dc power consumption data 412. In one example, the dynamic model 420 is a database stored in memory.

In one example, the SoC 410 generates the dynamic model 420 to capture a dynamic evolution of temperature values as a function of dc power values. In one example, the dynamic model 420 includes a plurality of temperature values Tmn which are indexed by column index m and row index n. In one example, the column index m denotes a dc power monitor and the row index n denotes a thermal sensor.

In one example, the SoC 410 uses the dynamic model 420 to determine dc power assignment in the computer platform. In one example, the dc power assignment is performed using an optimization process under a cost function and with a plurality of temperature limits as constraints. In one example, the cost function may be a quadratic function or a least-squares optimization. In one example, the dc power assignment involves cooperation between the SoC 410 and the HLOS.

In one example, the SoC 410 determines platform dc power consumption and distribution based on prevailing platform temperature conditions. For example, an impact of heat extraction capabilities (e.g., via fan speed changes) may be directly observed and accounted through thermal sensor temperature measurements. In one example, the SoC 410 monitors prevailing ambient conditions and tracks deviations to ambient conditions. In one example, the SoC 410 determines dc power assignment based on load requirements of various components in the computer platform. In one example, the dc power assignment incorporates more accurate thermal management of the computer platform with detailed accounting of significant heat generators.

In one example, platform dc power assignment optimization may exploit a z-transform transfer function methodology. In one example, a z-transform is a functional mapping from a discrete sequence $\{x_k\}$, with $k=1, 2, \ldots, K$, to a complex function (i.e., the z-transform) $X(z^{-1})$, with $z=a$ complex variable (i.e., an ordered pair of a real component and an imaginary component) and $z^{-1}$=complex multiplicative inverse of z (i.e. $z\,z^{-1}=1$). In one example, the z-transform $X(z^{-1})$ of the discrete sequence $\{x_k\}$ may be determined via the equation:

$$X(z^{-1})=\Sigma_k x_k z^{-k},$$

where the summation is over $k=1$ to K. In one example, z is an element of a complex domain (i.e., an ordered pair of two real domains). In one example, the z-transform is a complex polynomial of a complex variable $z^{-1}$ of order K. For example, the coefficients of the complex polynomial are successive values of the discrete sequence $\{x_k\}$ for $k=1, 2, \ldots, K$. That is, $X(z^{-1})=x_1 z^{-1}+x_2 z^{-2}+\ldots+x_K z^{-K}$. In one example, the successive values of the discrete sequence $\{x_k\}$ is a time series, that is, a function of discrete time with index k.

In one example, a first discrete sequence $T_i$ may be used to represent a plurality of temperature data, indexed with integer i. In one example, a second discrete sequence $P_j$ may be used to represent a plurality of dc power consumption data, indexed with integer j. In one example, a temperature $T_i$ from the plurality of temperature data and the plurality of dc power consumption data may be expressed using z-transforms with the following transfer function equation:

$$A_i(z^{-1})T_i(z^{-1})=\Sigma_j B_{ij}(z^{-1})P_j(z^{-1})+k_i T_{amb},$$

where j ranges from 1 to M, and
$A_i(z^{-1})$=first coefficient polynomial,
$B_{ij}(z^{-1})$=second coefficient polynomial,
$T_i(z^{-1})$=z-transform of the first discrete sequence $T_i$ (i.e., plurality of temperature data),
$P_j(z^{-1})$=z-transform of the second discrete sequence $P_j$ (i.e., plurality of dc power consumption data),
$k_i$=ambient gain of ambient temperature,
$T_{amb}$=ambient temperature of computer platform, deg C.
In one example, the transfer function equation characterizes a dynamic evolution of temperature values as a function of dc power values.

In one example, the first coefficient polynomial $A_i(z^1)$ may be approximated by an approximate first coefficient polynomial (i.e., single pole polynomial) in the form:

$$A_i(z^{-1})=1-p_i z^{-1}, \text{ where } p_i=\text{a first pole of the first coefficient polynomial } A_i(z^{-1})$$

That is, a pole is a solution to a polynomial equation which is set equal to zero. In one example, the first coefficient polynomial $A_i(z^{-1})$ may be approximated by other polynomials with a plurality of poles.

In one example, the second coefficient polynomial $B_{ij}(z^{-1})$ may be approximated by an approximate second coefficient polynomial which is constant in the form:

$$B_{ij}(z^{-1})=g_{ij}, \text{ where } g_{ij}=\text{gain from } dc \text{ power monitor } j \text{ to location of thermal sensor } i.$$

In one example, the second coefficient polynomial $B_{ij}(z^{-1})$ may be approximated by other polynomials with a plurality of poles.

In one example, using the approximate first coefficient polynomial and the approximate second coefficient polynomial, the temperature $T_i$ may be expressed with a simplified transfer function equation:

$$(1-p_i z^{-1})T_i(z^{-1})=\Sigma_j g_{ij}P_j(z^{-1})+k_i T_{amb}.$$

In one example, the simplified transfer function equation includes a plurality of parameters which may be estimated from measured data. In one example, the plurality of parameters of the simplified transfer function equation includes $p_i$, $g_{ij}$, and $k_i T_{amb}$. In one example, the ambient temperature $T_{amb}$ may be derived from estimates of other parameters (e.g., $p_i$, $g_{ij}$, and $k_i T_{amb}$). In one example, the parameter estimation may be performed using a recursive least squares (RLS) procedure. In one example, the RLS procedure minimizes a cost function for the parameter estimation. In one example, the cost function includes a quadratic function of an error metric.

In one example, each component of the computer platform may be allocated a target dc power allocation. For example, a first component may have a first dc power consumption $P_1$ and a first target dc power allocation $P_{1,tgt}$. For example, a second component may have a second dc power consumption $P_2$ and a second target dc power allocation $P_{2,tgt}$. In one example, the first component is a SoC and the second component is a dGPU.

In one example, the computer platform may have a dc power consumption requirement where $P_1 \leq P_{1,tgt}$ and $P_2 \leq P_{2,tgt}$. In one example, the dc power consumption requirement, first dc power consumption $P_1$ and second dc power consumption $P_2$ are periodically sent to a limits management module of the SoC. In one example, the dc power consumption requirement is determined by a dynamic workload (WL) analysis performed by the first component and the second component.

In one example, the platform dc power assignment optimization performs a minimization of a cost function subject to a maximum temperature constraint. In one example, the cost function C is a quadratic function of an error metric. In one example, the cost function may be expressed as a weighted quadratic error in the form:

$$C = w_1(P_1 - P_{1,tgt})^2 \text{ and } w_2(P_2 - P_{2,tgt})^2,$$

where $w_1$=first optimization weight and $w_1$=second optimization weight.

In one example, the error metric is a weighted quadratic error of dc power consumption relative to target dc power allocation for a plurality of components. In one example, the optimization weights $w_1$ and $w_2$ may be selected to bias the optimization towards either the first component or the second component. In one example, the optimization weights $w_1$ and $w_2$ may be normalized such that $w_1 + w_2 = 1$. In one example, the optimization weights may be selected on a task basis, for example, artificial intelligence (AI) applications, graphical applications, neural network applications, etc.

In one example, the platform dc power assignment optimization may incorporate successive values of a discrete sequence of temperature data $T_i(k)$ for k=1, 2, . . . , K, where i refers to an ith thermal sensor and i=1, 2, . . . , N. In one example, the successive values of the discrete sequence of temperature data $T_i(k)$ is a time series, that is, a function of discrete time with index k. In one example, N is the quantity of thermal sensors.

In one example, the platform dc power assignment optimization may be performed through minimization of the cost function C with a plurality of maximum temperature constraints where each maximum temperature constraint for the ith thermal sensor of the plurality of maximum temperature constraints is of the form:

$$T_{i,max} \geq \alpha_{i1}T_i(k) + \alpha_{i2}P_1 + \alpha_{i3}P_2 + \alpha_{i4}T_{amb}, i=1,2, \ldots N$$

where $T_{i,max}$ is the maximum allowed temperature value of the ith thermal sensor and constraint parameters $\alpha_{i1}$ $\alpha_{i2}$, $\alpha_{i3}$, $\alpha_{i4}$ may be functions of N, $p_i$, $g_{ij}$, $k_i$. In one example, the platform dc power assignment optimization may be solved in polynomial time. For example, polynomial time refers to a solution time bounded by a polynomial function of time. In one example, the platform dc power assignment optimization may be solved by the limits management module.

In one example, the platform dc power assignment optimization may be performed such that each thermal sensor does not exceed its maximum allowed temperature value $T_{i,max}$ over a duration of successive values of a discrete sequence of temperature data $T_i(k)$ for k=1, 2, . . . , K. In one example, the successive values of the discrete sequence of temperature data $T_i(k)$ is a time series, that is, a function of discrete time with index k.

Figure 5:
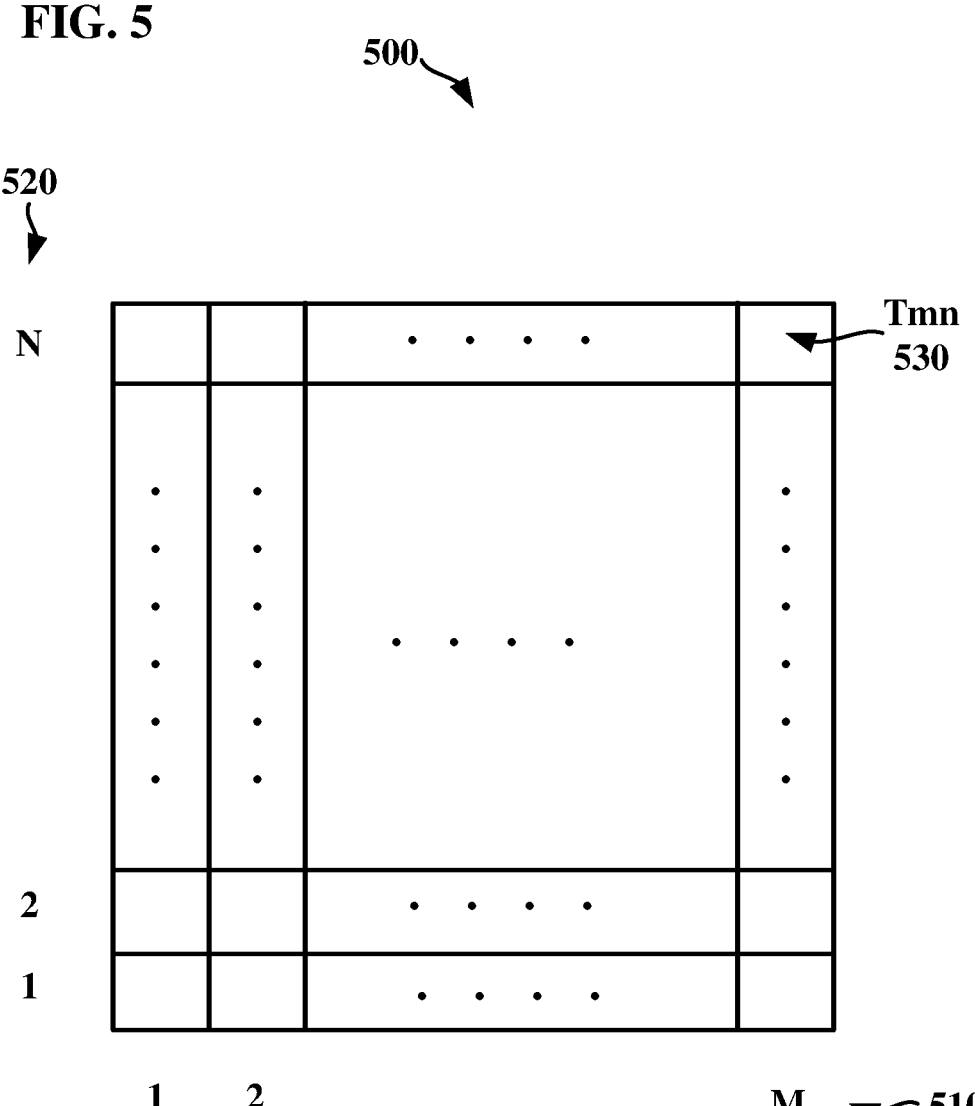
FIG. 5 illustrates an example graphical representation of a dynamic model.

In one example, FIG. 5 illustrates an example graphical representation 500 of a dynamic model (e.g., dynamic model 420 of FIG. 4). In one example, the graphical representation of the dynamic model 500 is a two-dimensional array of temperature values with column indices m 510 ranging from 1 to M in a horizontal direction and with row indices n 520 ranging from 1 to N in a vertical direction.

Figure 6:
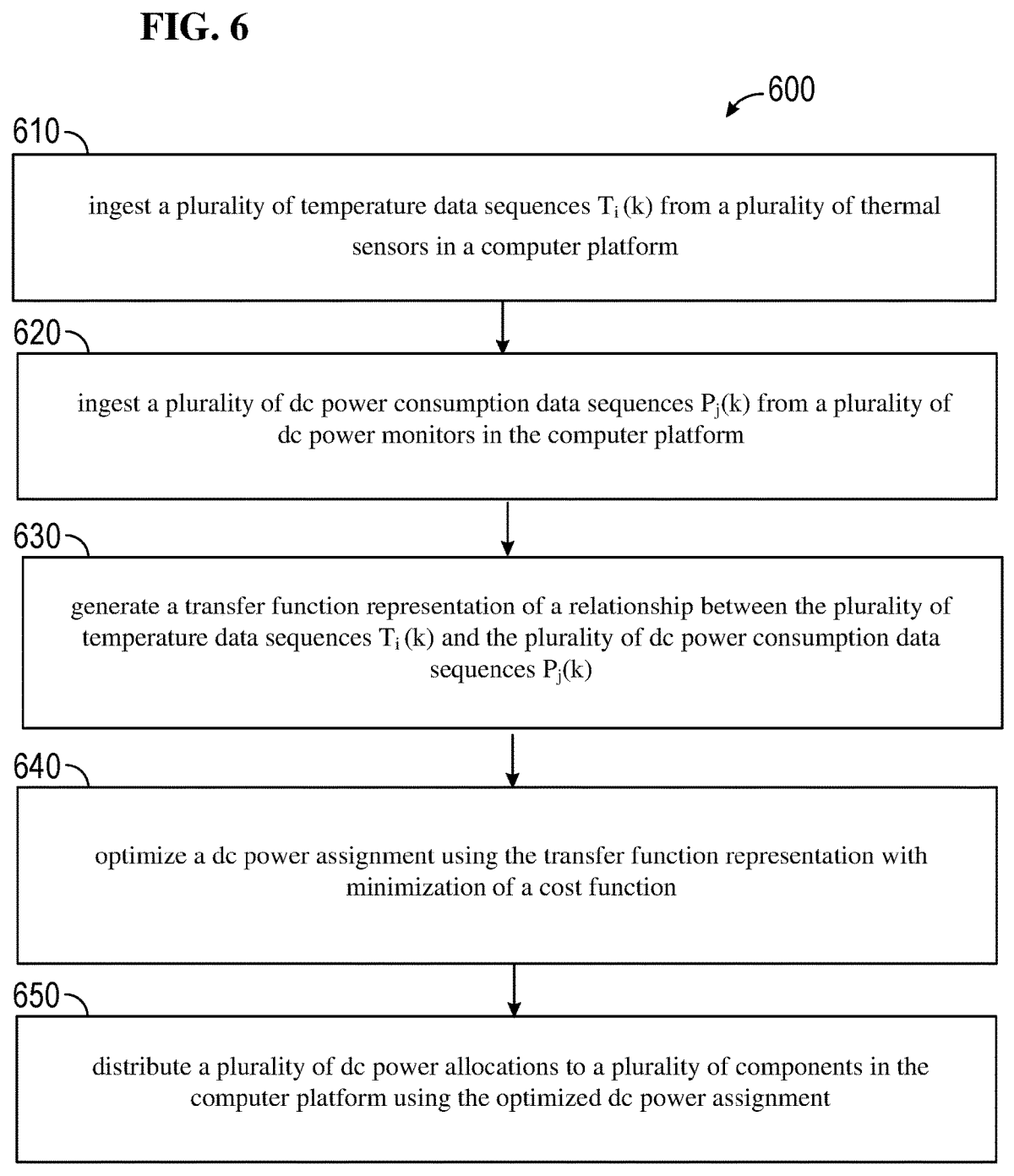

FIG. 6 illustrates an example flow diagram 600 for computer platform dc power assignment optimization. In block 610, ingest a plurality of temperature data sequences $T_i$ (k) from a plurality of thermal sensors in a computer platform. In one example, a plurality of temperature data sequences $T_i$ (k) is ingested from a plurality of thermal sensors in a computer platform. In one example, the plurality of thermal sensors has a quantity of N thermal sensors. In one example, the plurality of temperature data sequences $T_i$ (k) is a first plurality of time series with a duration of successive temperature data values ranging from k=1 to k=K.

In block 620, ingest a plurality of dc power consumption data sequences $P_j(k)$ from a plurality of dc power monitors in the computer platform. In one example, a plurality of dc power consumption data sequences $P_j(k)$ is ingested from a plurality of dc power monitors in the computer platform. In one example, the plurality of dc power monitors has a quantity of M dc power monitors. In one example, the plurality of dc power consumption data sequences $P_j(k)$ is a second plurality of time series with a duration of successive dc power consumption data values ranging from k=1 to k=K. In one example, the plurality of dc power monitors may be a plurality of dc current monitors. In one example, the plurality of dc current monitors may convert dc current measurements to dc power values, given known dc voltage values.

In block 630, generate a transfer function representation of a relationship between the plurality of temperature data sequences $T_i$ (k) and the plurality of dc power consumption data sequences $P_j(k)$. In one example, a transfer function representation of a relationship between the plurality of temperature data sequences $T_i$ (k) and the plurality of dc power consumption data sequences $P_j(k)$ is generated.

In one example, the transfer function representation includes a plurality of model parameters. In one example, the plurality of model parameters is part of a transfer function representation of the plurality of temperature data sequences $T_i(k)$ and the plurality of dc power consumption data sequences $P_j(k)$. In one example, the plurality of model parameters includes a pole of the transfer function representation. In one example, the plurality of model parameters includes a gain of the transfer function representation. In one example, the plurality of model parameters includes an ambient temperature.

In block 640, optimize a dc power assignment using the transfer function representation with minimization of a cost function. In one example, a dc power assignment is optimized using the transfer function representation with minimization of a cost function. In one example, the cost function is subject to a plurality of maximum temperature constraints. In one example, the cost function is a quadratic cost function. In one example, the cost function is a weighted quadratic error of dc power consumption relative to target dc power allocation for a plurality of components using a plurality of optimization weights. In one example, the optimization weights may be selected to bias the optimization selectively among the plurality of components. In one example, the optimization weights are based on a dynamic workload (WL) of the plurality of components. In one example, the plurality of maximum temperature constraints includes constraint parameters which are functions of the plurality of model parameters. In one example, the platform dc power assignment optimization may be solved in polynomial time.

In block 650, distribute a plurality of dc power allocations to a plurality of components in the computer platform using the optimized dc power assignment. In one example, a plurality of dc power allocations is distributed to a plurality of components in the computer platform using the optimized dc power assignment. In one example, the plurality of components includes a system on a chip (SoC). In one example, the plurality of components includes a dedicated graphical processing unit (dGPU).

In one aspect, one or more of the steps for providing a thermal management system for a computer system in FIG. 6 may be executed by one or more processors which may include hardware, software, firmware, etc. The one or more processors, for example, may be used to execute software or firmware needed to perform the steps in the flow diagram of FIG. 6. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. An apparatus comprising:
a plurality of thermal sensors configured to measure a plurality of temperature data sequences;
a plurality of dc power monitors configured to measure a plurality of dc power consumption data sequences; and
a system on a chip (SoC) configured to generate a z-transform transfer function representation of a relationship between the plurality of temperature data sequences and the plurality of dc power consumption data sequences.

2. The apparatus of claim 1, wherein the system on a chip (SoC) is further configured to optimize a dc power assignment using the z-transform transfer function representation.

3. The apparatus of claim 2, wherein the system on a chip (SoC) is further configured to optimize with minimization of a cost function.

4. The apparatus of claim 3, further comprising a computer platform, and wherein the system on a chip (SoC) is further configured to distribute a plurality of dc power allocations to a plurality of components in the computer platform using an optimized dc power assignment.

5. The apparatus of claim 4, wherein the system on a chip (SoC) is further configured to ingest the plurality of temperature data sequences from the plurality of thermal sensors.

6. The apparatus of claim 4, wherein the system on a chip (SoC) is further configured to ingest the plurality of dc power consumption data sequences from the plurality of dc power monitors.

7. An apparatus for implementing dc power assignment optimization, the apparatus comprising:

means for ingesting a plurality of temperature data sequences from a plurality of thermal sensors in a computer platform;

means for ingesting a plurality of de power consumption data sequences from a plurality of dc power monitors in the computer platform;

means for generating a z-transform transfer function representation of a relationship between the plurality of temperature data sequences and the plurality of dc power consumption data sequences;

means for optimizing a dc power assignment using the z-transform transfer function representation with minimization of a cost function; and means for distributing a plurality of dc power allocations to a plurality of components in the computer platform using the optimized dc power assignment.

8. A method comprising:

generating a z-transform transfer function representation of a relationship between a plurality of temperature data sequences and a plurality of dc power consumption data sequences;

optimizing a dc power assignment to generate an optimized dc power assignment using the z-transform transfer function representation with minimization of a cost function; and distributing a plurality of dc power allocations to a plurality of components in a computer platform using the optimized dc power assignment.

9. The method of claim 8, further comprising ingesting the plurality of temperature data sequences from a plurality of thermal sensors in the computer platform.

10. The method of claim 9, further comprising ingesting the plurality of dc power consumption data sequences from a plurality of dc power monitors in the computer platform.

11. The method of claim 10, wherein the z-transform transfer function representation includes a plurality of model parameters.

12. The method of claim 11, wherein the plurality of model parameters includes a pole of the z-transform transfer function representation.

13. The method of claim 11, wherein the plurality of model parameters includes a gain of the z-transform transfer function representation.

14. The method of claim 11, wherein the plurality of model parameters includes an ambient temperature.

15. The method of claim 11, wherein the cost function is subject to a plurality of maximum temperature constraints.

16. The method of claim 15, wherein the plurality of maximum temperature constraints includes one or more constraint parameters which are functions of the plurality of model parameters.

17. The method of claim 8, wherein the cost function is a weighted quadratic error of a dc power consumption relative to a target dc power allocation for the plurality of components using a plurality of optimization weights.

18. The method of claim 17, further comprising selecting the plurality of optimization weights to bias the optimization selectively among the plurality of components.

19. The method of claim 17, wherein the plurality of optimization weights are based on a dynamic workload (WL) of the plurality of components.

20. The method of claim 8, wherein the optimized dc power assignment is solved in polynomial time.

* * * * *